United States Patent [19]

Rogan et al.

[11]  4,255,281
[45]  Mar. 10, 1981

[54] ALPHA-OLEFIN POLYMERIZATION CATALYST AND PROCESS

[75] Inventors: John B. Rogan, Glen Ellyn; Charles K. Buehler, Woodridge, both of Ill.

[73] Assignee: Standard Oil Company (Indiana), Chicago, Ill.

[21] Appl. No.: 54,460

[22] Filed: Jul. 3, 1979

Related U.S. Application Data

[63] Continuation-in-part of Ser. No. 892,388, Mar. 31, 1978, abandoned.

[51] Int. Cl.³ .............................................. C08F 4/64
[52] U.S. Cl. .............................. 252/429 B; 526/136; 526/141; 526/142
[58] Field of Search ..................................... 252/429 B

[56] References Cited

U.S. PATENT DOCUMENTS

| | | | |
|---|---|---|---|
| 3,129,256 | 4/1964 | Hay et al. | 252/429 B X |
| 3,367,923 | 2/1968 | Tanaka et al. | 252/431 R X |
| 3,496,158 | 2/1970 | Fisher et al. | 252/429 B X |
| 3,549,717 | 12/1970 | Itakura et al. | 252/429 B X |
| 3,670,043 | 6/1972 | Kubicek et al. | 252/429 B X |
| 3,950,268 | 4/1976 | Karayannis et al. | 252/429 B |
| 3,984,350 | 10/1976 | Karayannis et al. | 252/429 B |
| 4,072,809 | 2/1978 | Rogan | 252/429 B X |

FOREIGN PATENT DOCUMENTS 1128724 10/1968 United Kingdom .

*Primary Examiner*—Patrick Garvin
*Attorney, Agent, or Firm*—Stephen L. Hensley; William T. McClain; William H. Magidson

[57] ABSTRACT

Process for modifying a titanium trichloride-organoaluminum alpha-olefin polymerization catalyst to reduce production of alkane soluble products during polymerization of alpha-olefins in the presence of such catalyst without substantial decreases in catalyst activity, said process comprising combining in an inert diluent and in the substantial absence of catalyst poisons, components comprising an alkylaluminum component, a titanium trichloride, hydrogen sulfide or a bis-(trialkyltin)sulfide, a tertiary amine, and an aromatic dicarbonyl compound selected from the group consisting of dialdehydes and lower alkyl diesters of ortho-, para- and meta-phthalic acids. Polyalpha-olefins containing reduced levels of low molecular weight and amorphous components are produced by contacting the catalysts with at least one polymerizable alpha-olefin under polymerizing conditions.

8 Claims, No Drawings

ALPHA-OLEFIN POLYMERIZATION CATALYST AND PROCESS

CROSS-REFERENCE TO RELATED APPLICATION

This is a continuation-in-part of our co-pending application Ser. No. 892,388, filed Mar. 31, 1978, and now abandoned.

BACKGROUND OF THE INVENTION

This invention relates to alpha-olefin polymerization catalysts, and more particularly, modification of catalyst systems used in the preparation of normally solid, crystalline polyalpha-olefins with combinations of certain tertiary amines, organotin sulfides or hydrogen sulfide, and aromatic dicarbonyl compounds to improve the stereospecificity of the polymeric products without substantial decreases in catalyst activities.

It is well known that alpha-olefins can be polymerized using titanium trichloride-organoaluminum compound catalysts to form polymeric products which, while predominately crystalline, contain amorphous and low molecular weight components. In order to obtain a commercially useful polyalpha-olefin product, it is desirable to minimize levels of such amorphous and low molecular weight components in the product because the presence of these components not only leads to processing difficulties in the fabrication of products from the polymers, but also, the finished products are typically inferior in terms of physical properties. While it is well known that the alkane solubility of low molecular weight and amorphous materials produced during alpha-olefin polymerization affords a convenient method for removal thereof from the polymeric product, removal is disadvantageous for a number of reasons. For example, in slurry polymerization processes, removal not only entails extra processing steps, but the removed components are of little commercial value, and therefore, are typically discarded. Moreover, in bulk and gas phase polymerization processes there is typically no provision for removal of alkane soluble materials.

In view of these difficulties, it is desirable to modify titanium trichloride-organoaluminum compound catalysts such that levels of low molecular weight and amorphous components produced during polymerization are reduced. While a wide variey of catalyst modifiers are known to the art, care must be exercised in the selection and use of modifiers because reductions in levels of low molecular weight and amorphous components are typically accompanied by decreases in catalyst activity and polymerization rate. Accordingly, an effective catalyst modifier is one that minimizes the production of alkane soluble components without substantial decreases in catalyst activities.

Prior art proposals which may be considered relevant to the present invention include British Pat. No. 1,128,724, to Mitsubishi, which discloses alpha-olefin polymerization catalysts containing titanium trichloride, an alkylaluminum compound, and certain aromatic carbonyl compounds. It is disclosed that the use of the latter compounds as catalyst modifiers decreases the production of alkane soluble materials with only slight decreases, and in some cases, light increases in polymerization rate. Among the aromatic carbonyl compounds disclosed are dimethyl terephthalate and diethyl terephthalate. U.S. Pat. No. 3,367,923, to Tanaka et al., although not directed to reducing alkane solubles in alpha-olefin polymerization, discloses that polymers of controlled molecular weights and high impact strengths can be prepared by carrying out the polymerization in the presence of hydrogen and a catalyst comprising an organoaluminum compound, a Group IV to VI metal compound, at least one of such compounds being an alkoxy or aryloxy compound, and a third component which can be an aromatic carboxylic acid ester. Among the aromatic esters disclosed are methyl, ethyl, butyl, hexyl, octyl, decyl, and higher esters of dibasic aliphatic or aromatic acids including phthalic acid. The preferred esters are dibutyl, dioctyl, or higher diesters of phthalic acid. U.S. Pat. No. 3,950,268, to Karayannis et al. discloses polymerization catalysts containing a lower alkyl alkylaluminum or alkylaluminum halide component, a titanium trichloride, and an organotin sulfide, such as a lower alkyl bis-(trialkyltin)sulfide, or a mixture thereof with certain amine oxides. It is disclosed that such catalysts are effective in reducing levels of alkane solubles produced during alpha-olefin polymerization with only insubstantial effects on crystalline yields. U.S. Pat. No. 4,072,809, to Rogan discloses that reductions in alkane solubles can be achieved without seriously affecting yields through the use of catalyst compositions containing an alkylaluminum component, a titanium trichloride, and combinations of hydrogen sulfide with a sterically hindered, lower alkyl substituted, cyclic amine oxide or tertiary amine or with a trihydrocarbylphosphite.

Despite the above-identified prior art proposals, there exists a need to modify alpha-olefin polymerization catalysts to further reduce levels of alkane soluble materials produced during polymerization of alpha-olefins without substantial decreases in catalyst activities, particularly in view of the fact that in large scale polymerization operations even minor variations in solubles production and activities can have substantial economic effects. Accordingly, it is an object of this invention to provide such a method of modifying alpha-olefin polymerization catalysts. A further object of the invention is to provide an improved alpha-olefin polymerization catalyst. Another object is to provide a process for producing highly crystalline alpha-olefin polymers using such catalysts. Other objects of this invention will be apparent to persons of skill in the art from the following description and appended claims.

The objects of this invention can be achieved by modifying alpha-olefin polymerization catalysts with certain organotin sulfides or hydrogen sulfide, tertiary amines, and aromatic dicarbonyl components. The use of the modified catalyst compositions of this invention in the polymerization of alpha-olefins not only results in reduced levels of alkane solubles in the polymeric product as compared with polyalpha-olefins produced using unmodified catalyst compositions, but such reductions in solubles are achieved with only minor decreases, and in some cases, increases in catalyst activities. Additionally, it has unexpectedly been found that the use of catalyst compositions containing three-component modifiers according to this invention results in improvements in solubles reduction and catalyst activities which are superior to those achieved through the use of catalyst compositions containing the individual modifier components or two of such components in combination. Furthermore, the use of the invented catalysts is particularly advantageous in continuous slurry polymerization processes wherein polymeric product is separated from a polymerization medium which is subsequently purified, such as by distillation, and then recycled to a polymerization zone, because the low volatility of the aromatic dicarbonyl modifiers prevents the same from vaporizing during purification of the polymerization medium and re-entering the polymerization zone upon recycle of the medium.

DESCRIPTION OF THE INVENTION

Briefly, the catalyst compositions of this invention comprise at least one organoaluminum compound, a titanium trichloride, at least one sulfide group containing modifier selected from the group consisting of hydrogen sulfide and lower alkyl bis-(trialkyltin)sulfides, at least one tertiary amine, and at least one aromatic dicarbonyl compound. As used herein, the phrase "lower alkyl" refers to alkyl radicals having from one to about six carbon atoms.

Useful organoaluminum compounds include alkylaluminum compounds and alkylaluminum halides represented by the formula $AlR_mX_{3-m}$, wherein R is a lower alkyl radical, X is a halogen, and m ranges from 1 to 3. Examples of useful organoaluminum components include trialkylaluminums such as triethylaluminum or triisobutylaluminum; dialkylaluminum halides such as diethylaluminum chloride or bromide or diisobutylaluminum chloride or bromide; alkylaluminum dihalides such as ethylaluminum dichloride or dibromide or isobutylaluminum dichloride or dibromide; and mixtures thereof, such as alkylaluminum sesquihalides. Preferred among such organoaluminum compounds are the dialkyaluminum halides, diethylaluminum chloride being most preferred.

The second component of the catalysts of this invention is a titanium trichloride. Generally, any titanium trichloride composition which can be used as a catalyst for the polymerization of alpha-olefins is suitable for use according to this invention. Examples include titanium trichloride in its various crystalline forms, such as alpha, beta, gamma, etc.; compositions based essentially upon titanium trichlorides, such as compositions prepared by reduction of titanium tetrachloride with aluminum; and titanium trichlorides and compositions based essentially thereon which have been activated such as by chemical, mechanical, or other means. Activated titanium trichloride compositions are preferred herein.

The sulfide group-containing components of the catalysts of this invention are selected from the group consisting of hydrogen sulfide and organotin sulfides. Useful organotin sulfides are the lower alkyl bis-(trialkyltin)sulfides such as bis-(trimethyltin)sulfide, bis-(triethyltin)sulfide, bis-(tributyltin)sulfide, bis-(trihexyltin)sulfide, and mixtures thereof. The preferred organotin sulfide is bis-(tributyltin)sulfide. As between hydrogen sulfide and the organotin sulfides, the former is preferred because of its lower cost and because polyalphaolefins produced using catalyst compositions containing organotin sulfides may contain traces of tin compounds which can lead to processing problems during fabrication of useful articles from the polymers.

Tertiary amines useful according to this invention are lower alkyl tertiary amines and sterically hindered, lower alkyl substituted, heterocyclic, tertiary amines, and mixtures thereof. Examples of the former include trimethylamine, triethylamine, tributylamine, and trihexylamine. Examples of useful sterically hindered, lower alkyl substituted, heterocyclic, tertiary amines include substituted pyridine derivatives such as 2,6-dimethylpyridine; 2,4,6-triethylpyridine; and 2,4,6-collidine. Preferred tertiary amines are tributylamine and 2,4,6-collidine, the latter being most preferred.

The fifth component of the catalysts of this invention is at least one aromatic dicarbonyl compound having the following structural formula:

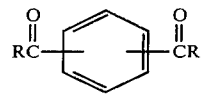

wherein R is hydrogen or $OR_1$, $R_1$ being a lower alkyl radical having from one to about six carbon atoms. Examples of suitable aromatic dicarbonyl compounds include phthalaldehyde, isophthalaldehyde, terephthalaldehyde, and the dimethyl, diethyl, dibutyl, etc. esters of phthalic, isophthalic, and terephthalic acid. Among these compounds, the dialdehydes and dimethyl and diethyl esters are preferred, the diethyl esters being particularly preferred as they allow for preparation of catalyst mixes having a relatively high degree of homogeneity.

According to the invention, titanium trichloride-organoaluminum compound alpha-olefin polymerization catalyts are modified such that the production of alkane solubles during polymerization in the presence of such catalysts is reduced without substantial decreases in catalyst activity by combining the catalyst components, preferably as a slurry in an inert diluent, in the substantial absence of oxygen, water, carbon dioxide, and other catalyst poisons. The temperature and the order in which the catalyst components are combined is not critical. However, it is often desirable to combine the organoaluminum component, the hydrogen sulfide or organotin sulfide, and the amine prior to addition of the titanium trichloride so that impurities which may be contained in the modifier components will be scavenged by the organoaluminum component thereby avoiding deactivation of the titanium trichloride.

Inert diluents useful in the preparation of catalysts include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyltoluene, n-propylbenzene, diethylbenzenes, and mono- and dialkylnaphthalenes, halogenated and hydrogenated aromatics such as chlorobenzene, tetrahydronaphthalene, decahydronaphthalene; high molecular weight liquid paraffins, mineral oil, and mixtures thereof. Preferably, the catalyst components are combined as a slurry in hexane, mineral oil, or mixtures thereof. Solid aromatic dicarbonyl catalyst components such as terephthalaldehyde, dimethyl terephthalate, and diethyl terephthalate, can be employed either in solid form or as a solution in an inert solvent such as benzene.

The individual catalyst components are combined in the substantial absence of oxygen, water, and other catalyst poisons. Such poisons can be excluded by combining the catalyst components under a blanket of an inert gas, such as nitrogen or argon, or under vacuum, or by other suitable means.

In the preparation of the catalyst compositions of this invention, catalyst components are employed in concentrations such that the resultant compositions provide for high yields of highly crystalline products when employed in alpha-olefin polymerization. Titanium trichloride and organoaluminum component concentrations typically vary depending on the type of titanium trichloride employed, reactor size, and polymerization process and conditions, and are well known to persons of skill in the art. Preferably, the molar ratio of organoaluminum component to titanium trichloride ranges from about one to about ten, and more preferably, from about one to about five. The remaining catalyst components are employed in concentrations which are effective to reduce alkane solubles produced during alpha-olefin polymerization without substantially decreasing catalyst activities. Preferably, the molar ratio of hydrogen sulfide or bis-(trialkyltin)sulfide to titanium trichloride ranges up to about 0.5, more preferably up to about 0.2, and most preferably from about 0.01 to about 0.1. Preferred amine concentrations range up to about 1.0 mol per mol of titanium trichloride, and more preferably up to about 0.4 mol per mol of titanium trichloride. Most preferably, the molar ratio of amine to titanium trichloride ranges from about 0.01 to about 0.1. Aromatic diester concentrations preferably range up to about 0.3 mol per mol of titanium trichloride, and more preferably, from about 0.005 to about 0.1 mol per mol of titanium trichloride. Aromatic dialdehydes are preferably employed in concentrations up to about 1.0, more preferably, up to about 0.5 mol per mol of titanium trichloride, and most preferably from about 0.1 to about 0.3 mol per mol of titanium trichloride.

The above-described catalysts are useful in the polymerization of alpha-olefins, particularly propylene, or mixtures thereof with ethylene or with another $C_4$ to $C_8$ alpha-olefin, to form highly crystalline polymeric products. According to the invention, highly crystalline polyalpha-olefins are prepared by contacting alpha-olefins with the above-described catalyst compositions under polymerizing conditions. Such conditions include polymerization temperature and time, monomer pressure, avoidance of contamination of catalysts, choice of polymerization medium in slurry processes, the use of additives to control polymer molecular weights, and other conditions well known to persons of skill in the art. Slurry, bulk, and vapor phase polymerization processes are contemplated herein.

Irrespective of the polymerization process employed, polymerization should be carried out at temperatures sufficiently high to ensure reasonable polymerization rates and avoid unduly long reactor residence times, but not so high as to result in the production of unreasonably high levels of alkane solubles due to rapid polymerization rates. Generally, temperatures range from about 0° to about 120° C. and preferably, from about 20° to about 95° C. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not exceed the vapor pressure, at the polymerization temperature, of the alpha-olefin to be polymerized.

The polymerization time is not critical and will generally range from about ½ to several hours in batch processes. Contact times of from about 1 to about 4 hours are typical in autoclave type reactions. In slurry processes, the contact or reaction time can be regulated as desired. Contact times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylenes, ethylbenzene, isopropylbenzene, ethyltoluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well known diluents. It is often desirable to purify the polymerization medium prior to use by distillation, percolation through a molecular sieve, contacting the medium with a compound, such as an alkylaluminum compound, capable of removing trace impurities, or by other suitable means.

Irrespective of polymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen and dialkylzinc compounds are commonly employed for such purposes in a manner welll known to persons of skill in the art.

Upon completion of polymerization, or when it is desired to terminate polymerization or deactivate the catalysts of this invention, the catalysts can be contacted with water, alcohols, acetone, or other suitable catalyst deactivators in a manner well known to persons of skill in the art.

The products produced in accordance with the process of this invention are normally solid, highly crystalline polyalpha-olefins containing low levels of amorphous and low molecular weight components. These products can be fabricated into useful articles by extrusion, injection molding, and other common techniques.

The following examples illustrate the present invention and are not to be construed as limiting the scope thereof.

GENERAL EXPERIMENTAL PROCEDURE

Catalyst compositions employed in EXAMPLES I-IV were prepared at ambient temperature in a nitrogen filled drybox by sequentially combining, in mineral oil, a 24.7 wt.% solution of diethylaluminum chloride in hexane; a sulfide group containing modifier, if any; an amine, if any; a brown solid, beta titanium trichloride; and then an aromatic dicarbonyl modifier, if any. The mineral oil, identified by the Plough, Inc. trademark Nujol, had been dried prior to use by heating to 100° C. and passing dry, oxygen-free nitrogen therethrough for 4 hours. Hydrogen sulfide, when used, was injected into the vapor phase above the diethylaluminum chloride-hexane-Nujol mixture. Bis-(tributyltin)sulfide, tributylamine, and 2,4,6-collidine, when used, were employed as neat liquids. In EXAMPLE I, diethyl terephthalate and terephthalaldehyde, when used, were added in solid form. The form in which aromatic dicarbonyl components were employed in EXAMPLES II-IV is set forth in the individual examples. During catalyst preparation, the individual components were added separately with stirring following each addition. The amount of titanium trichloride employed in each preparation was 2.5 g. and the remaining components were used in amounts sufficient to give the molar ratios set forth in TABLES I–IV. The resultant catalyst slurries were employed in the polymerizations described in EXAMPLES I–IV. In each polymerization run the amount of slurry employed contained 50 mg. of catalyst. Generally, catalyst slurries had been stored for up to 24 hours prior to carrying out the polymerization runs.

EXAMPLE I

A series of propylene polymerization runs were conducted using catalyst compositions containing diethylaluminum chloride ($Et_2AlCl$) and titanium trichloride ($TiCl_3$), in a molar ratio of 4.2:1, and one or more of the following additives: hydrogen sulfide ($H_2S$), bis-(tributyltin)sulfide (BTS), 2,4,6-collidine (Coll), tributylamine (TBA), diethyl terephthalate (DET), and terephthalaldehyde (TPA). Modifiers and modifier concentrations are reported in TABLE I. The $TiCl_3$ used in all runs was a pilot plant sample of brown solid, beta $TiCl_3$ prepared according to U.S. Pat. No. 3,984,350; however, the production lot used for Runs 2, 3, 4(a)-(e), 8(a) and (b), and 11(a) differed from that used for Runs 1, 5–7, 9(a) and (b), 10, and 11(b). In addition, the $TiCl_3$ used in Runs 4(a)–(d) and that used in 4(e) were taken from different batches of the same lot. Similarly, the $TiCl_3$ used in 8(a) and (b) came from different batches of the same lot.

Unless otherwise indicated, the polymerizations were carried out over a period of 2 hours in a 2-liter Parr reactor in 750 ml. hexane at a temperature of 160° F., and under a hydrogen pressure of 7 psia and a total pressure of 260 psig. The polymerizations were terminated by venting the reactor and adding methanol to the contents thereof.

Following each polymerization, the slurry of polymeric product was filtered and the solid product was dried and weighed. Activity is reported in TABLE I as grams of solid polymer per gram of catalyst per hour. Following filtering of the product, an aliquot of the filtrate was evaporated to dryness and the residue was weighed. Percent solubles was determined by dividing residue weight calculated for the entire filtrate, by the weight of solid polymer and residue, and then multiplying by 100%. Percent extractables was determined by Soxhlet extraction of a portion of the solid polymer with hexane. The sum of percent solubles and percent extractables is reported in TABLE I as Alkane Solubles.

TABLE I

| Run No. | Modifier | Modifier Concentration (mol/mol $TiCl_3$) | Activity* | Alkane Solubles** |
|---|---|---|---|---|
| 1 | None | | 1740 | 10.8 |
| 2 | DET | 0.03 | 1580 | 8.4 |
| 3 | BTS/DET | 0.06/0.03 | 1170 | 4.0 |
| 4(a)*** | BTS/Coll | 0.06/0.06 | 1170 | 3.4 |
| (b) | BTS/Coll | 0.06/0.06 | 1080 | 5.4 |
| (c) | BTS/Coll | 0.06/0.06 | 860 | 6.0 |
| (d) | BTS/Coll | 0.06/0.06 | 1070 | 6.3 |
| (e) | BTS/Coll | 0.06/0.06 | 1780 | 6.0 |
| (average) | BTS/Coll | 0.06/0.06 | 1332 | 5.4 |
| 5 | BTS/TBA | 0.06/0.06 | 1680 | 5.9 |
| 6 | Coll/DET | 0.06/0.03 | 1110 | 5.2 |
| 7 | Coll/TPA | 0.06/0.20 | 1290 | 4.2 |
| 8(a)*** | BTS/Coll/DET | 0.06/0.06/0.03 | 930 | 3.7 |
| (b) | BTS/Coll/DET | 0.06/0.06/0.03 | 1430 | 2.0 |
| 9(a)*** | $H_2S$/Coll/DET | 0.06/0.06/0.03 | 1280 | 2.7 |
| 9(b) | $H_2S$/Coll/DET | 0.06/0.06/0.03 | 1370 | 2.4 |
| 10 | BTS/TBA/DET | 0.06/0.06/0.03 | 1270 | 3.1 |
| 11(a)*** | BTS/Coll/TPA | 0.06/0.06/0.20 | 1745 | 3.4 |
| (b) | BTS/Jul****/TPA | 0.06/0.06/0.20 | 1725 | 2.8 |

*g. polymer/g. catalyst/hr.
**wt. %
***Polymerization conditions in Runs 4, 8, 9, and 11 were identical to the conditions described above except the polymerization time was 4 hours and $H_2$ pressure was 10 psia.
****Julolidine (2,3,6,7-tetrahydro-1-H,5-H-benzo-[ij]-quinolizine, 98% as obtained from Alrich Chemical Company) used in place of Coll in this run.

Example I and TABLE I illustrate the effects of the invented modifier system on the stereospecificity and activity of titanium trichloridediethylaluminum chloride catalysts. In addition, there are presented comparative runs showing the effects of individual components of the invented modifier system and various binary combinations of such components. Although direct comparison of the runs in TABLE I is difficult due to variations in polymerization conditions and titanium trichloride lots and batches, it can be seen from the table that the invented modifier system (Runs 8–11) generally gave best results in terms of solubles at activities at least comparable to those reported for the one- and two-component modified catalysts.

EXAMPLE II

A series of propylene polymerizations were conducted using catalyst compositions containing titanium trichloride ($TiCl_3$) and diethylaluminum chloride ($Et_2AlCl$), bis-(tributyltin)sulfide (BTS), 2,4,6-collidine (Coll), and the dimethyl esters of phthalic, isophthalic, and terephthalic acids in varying amounts relative to the titanium trichloride. Unless otherwise indicated, the dicarbonyl components were employed in the form of a solution in benzene during catalyst preparation. In each polymerization run, the polymerization process was a slurry process, and unless otherwise indicated, was carried out in a 2-liter Parr reactor in 750 ml. hexane for 4 hours at a temperature of 160° F., a hydrogen pressure of 10 psia, and a total pressure of 260 psig. The polymerizations were terminated in the manner described in Example I. Catalyst compositions and activities and alkane solubles determined as described in Example I are reported in TABLE II. As used in the table, DMT refers to dimethyl terephthalate, DMP refers to dimethyl phthalate, and DMIP refers to dimethyl isophthalate.

TABLE II

| Run | Catalyst Composition and Molar Ratios | Activity* | Alkane Solubles** |
|---|---|---|---|
| | $Et_2AlCl/TiCl_3$/BTS/Coll/DMT | | |
| 1 | 3.0/1.0/0.03/0.06/— | 1902 | 4.9 |
| 2 | 3.0/1.0/0.03/0.06/0.015 | 1793 | 3.5 |
| 3 | 3.0/1.0/0.02/0.06/0.03 | 1686 | 2.7 |
| 4 | 4.2/1.0/0.06/0.06/— | 1320 | 4.5 |
| 5 | 4.2/1.0/0.06/0.06/0.03 | 1344 | 2.8 |
| 6 | 4.2/1.0/0.06/0.06/0.03 | 1340 | 2.8 |
| 7*** | 4.2/1.0/0.06/0.06/0.03 | 980 | 3.2 |
| 8*** | 4.2/1.0/0.06/0.06/0.03 | 1050 | 3.5 |
| | $Et_2AlCl/TiCl_3$/BTS/Coll/DMP | | |
| 9 | 4.2/1.0/0.06/0.06/— | 1320 | 4.5 |
| 10 | 4.2/1.0/0.06/0.06/0.0075 | 1356 | 3.1 |
| 11 | 4.2/1.0/0.06/0.06/0.03 | 1007 | 1.6 |
| 12 | 4.2/1.0/0.06/0.06/0.03 | 1108 | 2.1 |

TABLE II-continued

| Run | Catalyst Composition and Molar Ratios | Activity* | Alkane Solubles** |
|---|---|---|---|
| | $Et_2AlCl/TiCl_3/BTS/Coll/DMIP$ | | |
| 13**** | 4.2/1.0/0.06/0.06/— | 1347 | 4.2 |
| 14 | 4.2/1.0/0.06/0.06/0.015 | 1740 | 3.9 |
| 15***** | 4.2/1.0/0.06/0.06/0.015 | 1700 | 4.0 |
| 16 | 4.2/1.0/0.06/0.06/0.03 | 1080 | 2.0 |
| 17***** | 4.2/1.0/0.06/0.06/0.03 | 1450 | 2.3 |
| 18 | 4.2/1.0/0.06/0.06/0.03 | 1540 | 5.2 |

*g. polymer/g. catalyst/hr.
**wt. %
***DMT added as solid during catalyst preparation
****Average of 3 runs
*****DMIP reacted with $Et_2AlCl$ prior to catalyst preparation

EXAMPLE III

A series of propylene polymerizations were conducted in accordance with the procedure described in Example II using catalyst compositions containing titanium trichloride ($TiCl_3$), diethylaluminum chloride ($Et_2AlCl$), bis-(tributyltin)sulfide (BTS), 2,4,6-collidine (Coll), and diethyl terephthalate (DET) or diethyl phthalate (DEP) in varying amounts relative to the titanium trichloride. Diethyl phthalate was added in liquid form during catalyst preparation, and, unless otherwise indicated, diethyl terephthalate was added in solid form. Catalyst compositions, activities, and alkane solubles are reported in TABLE III. For purposes of comparison, the results of Runs 4 (average), 8(a), 8(b), 9(a), 9(b), 5, and 10 of TABLE I are reproduced in TABLE III as Runs 1, 3, 4, 6, 7, 8, and 9 respectively.

TABLE III

| Run | Catalyst Composition and Molar Ratios | Activity* | Alkane Solubles** |
|---|---|---|---|
| | $Et_2AlCl/TiCl_3/BTS/Coll/DET$ | | |
| 1 | 4.2/1.0/0.06/0.06/— | 1332 | 5.4 |
| 2 | 4.2/1.0/0.06/0.06/0.015 | 1470 | 2.7 |
| 3 | 4.2/1.0/0.06/0.06/0.03 | 930 | 3.7 |
| 4 | 4.2/1.0/0.06/0.06/0.03 | 1430 | 2.0 |
| 5*** | 4.2/1.0/0.06/0.06/0.03 | 1670 | 4.1 |
| | $Et_2AlCl/TiCl_3/H_2S/Coll/DET$ | | |
| 6**** | 4.2/1.0/0.06/0.06/0.03 | 1280 | 2.7 |
| 7**** | 4.2/1.0/0.06/0.06/0.03 | 1370 | 2.4 |
| | $Et_2AlCl/TiCl_3/BTS/TBA/DET$ | | |
| 8**** | 4.2/1.0/0.06/0.06/— | 1680 | 5.9 |
| 9**** | 4.2/1.0/0.06/0.06/0.03 | 1270 | 3.1 |
| | $Et_2AlCl/TiCl_3/BTS/Coll/DEP$ | | |
| 10***** | 4.2/1.0/0.06/0.06/— | 1891 | 4.2 |
| 11 | 4.2/1.0/0.06/0.06/0.03 | 1695 | 3.9 |
| 12 | 4.2/1.0/0.06/0.06/0.06 | 1345 | 3.3 |

*g. polymer/g. catalyst/hour
**wt. %
*DET reacted with $Et_2AlCl$ prior to catalyst preparation.16 **Polymerization conditions were identical to those described in Example III except polymerization time was 2 hours and $H_2$ pressure was 7 psia.
*****Average of 4 runs

EXAMPLE IV

A series of propylene polymerizations were conducted in accordance with the procedure described in Example II using catalyst compositions containing titanium trichloride ($TiCl_3$), diethylaluminum chloride ($Et_2AlCl$), bis-(tributyltin)sulfide (BTS), 2,4,6-collidine (Coll), and varying amounts of terephthalaldehyde (TPA) relative to the titanium trichloride. During catalyst preparation, terephthalaldehyde was employed in solid form. Catalyst compositions, activities, and alkane solubles are reported in TABLE IV. For purposes of comparison, the results of Runs 11(a) and 11(b) of TABLE I are reproduced in TABLE IV as Runs 8 and 9 respectively.

TABLE IV

| Run | Catalyst Composition and Molar Ratios | Activity* | Alkane Solubles** |
|---|---|---|---|
| | $Et_2AlCl/TiCl_3/BTS/Coll/TPA$ | | |
| 1*** | 4.2/1.0/0.06/0.06/— | 1645 | 4.2 |
| 2 | 4.2/1.0/0.06/0.06/0.03 | 1850 | 4.9 |
| 3 | 4.2/1.0/0.06/0.06/0.03 | 1995 | 5.3 |
| 4 | 4.2/1.0/0.06/0.06/0.06 | 2140 | 5.4 |
| 5 | 4.2/1.0/0.06/0.06/0.06 | 1715 | 4.0 |
| 6 | 4.2/1.0/0.06/0.06/0.06 | 1775 | 4.9 |
| 7**** | 4.2/1.0/0.06/0.06/— | 1891 | 4.2 |
| 8 | 4.2/1.0/0.06/0.06/0.20 | 1745 | 3.4 |
| 9 | 4.2/1.0/0.06/0.06/0.20 | 1725 | 2.8 |
| 10 | 4.2/1.0/0.06/0.06/0.24 | 1730 | 2.8 |

*g. polymer/g. catalyst/hour
**wt. %
***Average of 2 runs
****Average of 4 runs

EXAMPLE V

A catalyst composition containing diethylaluminum chloride, titanium trichloride, hydrogen sulfide, 2,4,6-collidine, and dimethyl phthalate in a molar ratio of 3.0/1.0/0.03/0.06/0.03 was prepared at ambient temperature in a nitrogen blanketed drybox according to the following procedure. Into a 4-ounce glass bottle equipped with magnetic stirrer were added 65.3 ml. dried Nujol followed by 33.3 ml. of a 24.7 wt.% solution of diethylaluminum chloride in hexane. The contents of the bottle were stirred and then 11.74 ml. of hydrogen sulfide was injected into the vapor space above the contents of the bottle and the contents again stirred. Thereafter, 0.125 ml. 2,4,6-collidine, 2.5 g. of a brown, solid beta titanium trichloride, and 0.078 ml. dimethyl phthalate were separately added with stirring following each addition.

Propylene was polymerized in the presence of the resultant catalyst slurry in a stirred quench cooled, horizontal, gas phase polymerization reactor. Soxhlet extraction of a portion of the solid polymeric product with hexane indicated that levels of extractables as low as 2.8 wt.% were obtained.

Examples II-V and TABLES II-IV illustrate that the catalyst compositions of this invention, comprising an organoaluminum component such as diethylaluminum chloride, a titanium trichloride, at least one sulfide group containing modifier selected from the group consisting of hydrogen sulfide and a bis-(trialkyltin)sulfide such as bis-(tributyltin)sulfide, at least one tertiary amine such as 2,4,6-collidine or tributylamine, and at least one dialdehyde or lower alkyl diester of phthalic, isophthalic, or terephthalic acid, can be employed in the polymerization of alpha-olefins to significantly decrease the production of alkane soluble components with increases or only insubstantial decreases in catalyst activities.

EXAMPLE VI

A series of catalysts were prepared in a nitrogen-filled drybox by adding to a 4-ounce glass bottle, with stirring, 35.5±0.1 ml. hexane followed by 24.9 wt.% $Et_2AlCl$ in hexane, BTS if used, Coll if used, a brown solid beta titanium trichloride prepared according to U.S. Pat. No. 3,984,350, and diethyl terephthalate if used, in amounts corresponding to the molar ratios set forth in TABLE V. A series of propylene polymerization runs were conducted in a stirred, 2 liter Parr reactor in 750 ml. hexane by syringing 2.0 ml. of the resulting catalyst mixes (containing approximately 0.05 g. of the titanium trichloride component) into the reactor and polymerizing for 2 hours at 160° F. and 260 psi under a partial pressure of hydrogen as specified in TABLE V. Reactor contents were agitated at 460 rpm throughout each run. Polymerization was terminated by opening the reactor to the atmosphere, solid polypropylene was recovered by filtration and solubles and extractables determined as described hereinabove. Activities, in grams polypropylene per gram of catalyst charged per hour, also were determined. Due to the heterogeneous nature of the catalyst mixes, it is not always possible to ensure that identical amounts of catalyst are syringed into the reactor. Accordingly, to obtain a more accurate determination of activity, sample buttons (1¼" diameter×⅜" thickness) were molded from unstabilized, unextracted samples of the polypropylene obtained in the polymerization runs and analyzed for titanium content. The sample buttons were molded on a ¾ oz., ram injection molding machine (WASP Mini-Jector, manufactured by Newbury Industries, Inc.) at a barrel temperature of 480°–495° F. and an injection pressure of 1000–1100 psi. Both sides of each sample button were analyzed for titanium in parts per million, by X-ray flourescence using a Phillips PW 1450/80 X-ray flourescence spectrometer. A titanium content of 31 p.p.m. has been found to correspond to 10,000 g. polypropylene per gram titanium trichloride. Using this standard, activities for each polymerization run were calculated by multiplying the ratio of 31 to average titanium content for the two sides of each button by 10,000 and then dividing this by the 2 hour polymerization time in each run.

For each run, catalyst composition (molar ratio of $Et_2AlCl/TiCl_3/BTS/Coll/DET$), hydrogen partial pressure ($H_2$), activity based on amount of catalyst charged (A1), activity based on titanium content of sample buttons (A2), solubles (Sol.), extractables (Ext.), and Sol.+Ext. are reported in TABLE V.

TABLE V

| Run | Catalyst Molar Ratio of $Et_2AlCl/TiCl_3/BTS/Coll/DET$ | $H_2$ (psig.) | A1 (g./g. catalyst/hr.) | A2 (g./g. $TiCl_3$/hr.) | Sol. (wt. %) | Est. (wt. %) | Sol. + Ext. (wt. %) |
|---|---|---|---|---|---|---|---|
| 1  | 4.2/1/—/—/—         | 22.5 | 1285 | 2980 | 1.1 | 4.7  | 5.8  |
| 2  | 4.2/1/—/—/—         | 22.5 | 1844 | 3690 | 1.8 | 5.7  | 7.5  |
| 3  | 4.2/1/—/—/—         | 22.5 | 1126 | 3100 | 2.2 | 4.8  | 7.0  |
| 4  | 4.2/1/—/—/—         | 14.5 | 1265 | 2672 | 2.5 | 5.4  | 7.9  |
| 5  | 4.2/1/—/—/—         | 14.5 | 2342 | 2697 | 1.7 | 6.2  | 7.9  |
| 6  | 4.2/1/0.06/—/—      | 22.5 | 2206 | 3370 | 1.3 | 3.9  | 5.2  |
| 7  | 4.2/1/0.06/—/—      | 22.5 | 2575 | 3297 | 1.6 | 3.4  | 5.0  |
| 8  | 4.2/1/0.06/—/—      | 14.5 | 1342 | 2385 | 0.7 | 2.1  | 2.8  |
| 9  | 4.2/1/0.06/—/—      | 14.5 | 2110 | 3266 | 1.5 | 2.8  | 4.3  |
| 10 | 4.2/1/—/0.06/—      | 22.5 | 3007 | 3370 | 0.6 | 4.5  | 5.1  |
| 11 | 4.2/1/—/0.06/—      | 22.5 | 2365 | 2844 | 1.3 | 3.9  | 5.2  |
| 12 | 4.2/1/—/0.06/—      | 14.5 | 1913 | —    | 1.5 | 3.8  | 5.3  |
| 13 | 4.2/1/—/0.06/—      | 14.5 | 2050 | 2649 | —   | 3.9  | —    |
| 14 | 4.2/1/—/—/0.03      | 14.5 | 2142 | 2719 | 0.8 | 2.4  | 3.2  |
| 15 | 4.2/1/—/—/0.03      | 14.5 | 1885 | 2743 | 1.1 | 2.4  | 3.5  |
| 16 | 4.2/1/0.06/0.06/—   | 22.5 | 2686 | 3230 | 1.2 | 2.7  | 3.9  |
| 17 | 4.2/1/0.06/0.06/—   | 22.5 | 2554 | 2844 | 1.0 | 2.1  | 3.1  |
| 18 | 4.2/1/0.06/0.06/—   | 14.5 | 2892 | 3370 | 0.5 | 1.5  | 2.0  |
| 19 | 4.2/1/0.06/0.06/—   | 14.5 | 2158 | 2957 | 1.1 | 1.7  | 2.7  |
| 20 | 4.2/1/0.06/—/0.03   | 14.5 | 2275 | 2605 | 0.8 | 2.5  | 3.3  |
| 21 | 4.2/1/0.06/—/0.03   | 14.5 | 1774 | 2844 | 1.1 | 1.7  | 2.8  |
| 22 | 4.2/1/—/0.06/0.03   | 14.5 | 1470 | 2123 | 0.9 | 2.1  | 3.0  |
| 23 | 4.2/1/—/0.06/0.03   | 14.5 | 1606 | 2330 | 1.1 | 2.3  | 3.4  |
| 24 | 4.2/1/0.06/0.06/0.03| 14.5 | 2020 | 2331 | 0.5 | 1.0  | 1.5  |
| 25 | 4.2/1/0.06/0.06/0.03| 14.5 | 2088 | 2460 | 0.8 | 2.0* | 2.8* |
| 26 | 4.2/1/0.06/0.06/0.03| 14.5 | 2241 | 2348 | 0.8 | 1.0  | 1.8  |

*Not representative of true catalyst behavior. Extraction of another sample of polymer from this run gave 0.8 wt. % Ext., and accordingly, 1.6 wt. % Sol. + Ext.

Example VI and TABLE V illustrate the effects of the invented modifier system as well as individual modifiers and binary combinations thereof on solubles, extractables, and activity. With the exception of the non-representative extractables and solubles plus extractables figures in Run 25, the invented catalysts gave substantially better results in terms of reducing total byproduct (solubles plus extractables) levels. Additionally, these reductions were attained at A2 activities generally comparable to or only insubstantially less than those attained through the use of the individual modifiers and binary combinations thereof. As noted hereinabove, variations inherent in the manner of adding catalyst to the reactor (i.e. syringing samples of the heterogeneous catalyst mix) led to variations in the amount of catalyst used in each run. Accordingly, while direct comparison of A1 activities is difficult, it can still be seen that the A1 activities in the runs using the invented catalyst are generally comparable to those in the comparative runs.

We claim:

1. A process for modifying a titanium trichlorideorganoaluminum compound alpha-olefin polymerization catalyst to reduce production of alkane soluble products during polymerization of alpha-olefins in the presence of said catalyst without substantial decreases in catalyst activity, said process comprising combining, in an inert diluent in the substantial absence of catalyst poisons, components comprising:
   (a) at least one lower alkyl dialkylaluminum chloride;
   (b) an activated titanium trichloride;
   (c) an effective amount, ranging up to about 0.2 mole per mole of said titanium trichloride, of bis-(tributyltin)sulfide;
   (d) an effective amount, ranging up to about 0.4 mole per mole of said titanium trichloride, of 2,4,6-collidine; and (e) an effective amount, ranging up to about 0.3 mole per mole of said titanium trichloride, of at least one dimethyl or diethyl ester of phthalic, isophthalic or terephthalic acid;

said effective amounts being effective to reduce levels of alkane soluble components produced during polymerization of alpha-olefins without substantial decreases in catalyst activity.

2. An alpha-olefin polymerization catalyst composition capable of reducing the level of alkane soluble components produced during polymerization in the presence of said catalyst without substantial decreases in catalyst activity comprising:

(a) at least one lower alkyl dialkylaluminum chloride;
(b) an activated titanium trichloride;
(c) an effective amount, ranging up to about 0.2 mole per mole of said titanium trichloride, of bis-(tributyltin)sulfide;
(d) an effective amount, ranging up to about 0.4 mole per mole of said titanium trichloride, of 2,4,6-collidine; and
(e) an effective amount, ranging up to about 0.3 mole per mole of said titanium trichloride, of at least one dimethyl or diethyl ester of phthalic, isophthalic or terephthalic acid;

said effective amounts being effective to reduce alkane soluble components produced during polymerization of alpha-olefins without substantial decreases in catalyst activity.

3. The catalyst of claim 2 wherein component (e) is dimethyl phthalate, dimethyl isophthalate or dimethyl terephthalate.

4. The catalyst of claim 2 wherein (e) is diethyl phthalate.

5. The catalyst of claim 2 wherein (e) is diethyl terephthalate.

6. The catalyst of claim 5 wherein the effective amount of diethyl terephthalate ranges from about 0.005 to about 0.1 mole per mole of said titanium trichloride.

7. The catalyst of claim 6 wherein the effective amount of 2,4,6-collidine ranges from about 0.01 to about 0.1 mole per mole of said titanium trichloride.

8. The catalyst of claim 7 wherein the effective amount of bis-(tributyltin)sulfide ranges from about 0.01 to about 0.1 mole per mole of said titanium trichloride.

* * * * *

UNITED STATES PATENT OFFICE
CERTIFICATE OF CORRECTION

Patent No. 4,255,281　　　　　　　　　　　Dated March 10, 1981

Inventor(s) John B. Rogan and Charles K. Buehler

It is certified that error appears in the above-identified patent and that said Letters Patent are hereby corrected as shown below:

| Patent Column | Line | |
|---|---|---|
| 1 | 38 | "entains" should be --entails-- |
| 1 | 65 | "light" should be --slight-- |
| 9 | 52 | "preparation.16**Polymerization" should be --preparation.** polymerization-- |
| 12 | 5 | "Est" (heading in next to last column in Table V) should be --Ext.-- |
| 12 | 53 | "trichlorideor" should be --trichloride or- -- |

Signed and Sealed this

Seventeenth Day of August 1982

[SEAL]

Attest:

Attesting Officer

GERALD J. MOSSINGHOFF

Commissioner of Patents and Trademarks